(12) United States Patent
Park et al.

(10) Patent No.: US 8,036,726 B2
(45) Date of Patent: Oct. 11, 2011

(54) SLIDING MODULE FOR PORTABLE TERMINAL

(75) Inventors: Jeong-Seok Park, Suwon-si (KR); Kwang-Ho Jung, Suwon-si (KR); Kwang-Su Seo, Suwon-si (KR); Jong-Hoon Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 622 days.

(21) Appl. No.: 11/411,281

(22) Filed: Apr. 26, 2006

(65) Prior Publication Data
US 2007/0105605 A1    May 10, 2007

(30) Foreign Application Priority Data
Nov. 7, 2005 (KR) .................. 10-2005-0105967

(51) Int. Cl.
*H04M 1/00* (2006.01)
(52) U.S. Cl. .............. 455/575.4; 528/425; 343/872
(58) Field of Classification Search ............ 455/575.4; 528/425; 343/872
See application file for complete search history.

(56) References Cited

U.S. PATENT DOCUMENTS

| | | | | |
|---|---|---|---|---|
| 6,388,049 B1 * | 5/2002 | Yokoyama et al. | ........... | 528/425 |
| 7,257,432 B2 * | 8/2007 | Nan | ........... | 455/575.4 |
| 7,496,389 B2 * | 2/2009 | Cho et al. | ........... | 455/575.4 |
| 2003/0119544 A1 | 6/2003 | Gventer | | |
| 2004/0085251 A1 * | 5/2004 | Shimura | ........... | 343/872 |
| 2005/0113154 A1 * | 5/2005 | Park et al. | ........... | 455/575.4 |
| 2006/0025184 A1 * | 2/2006 | Cho et al. | ........... | 455/575.4 |

FOREIGN PATENT DOCUMENTS

| | | |
|---|---|---|
| CN | 1617548 | 11/2004 |
| EP | 1 501 260 | 1/2005 |
| EP | 1 530 345 | 5/2005 |
| EP | 1 583 328 | 10/2005 |

* cited by examiner

*Primary Examiner* — Rafael Pérez-Gutiérrez
*Assistant Examiner* — Munjal Patel
(74) *Attorney, Agent, or Firm* — The Farrell Law Firm, P.C.

(57) ABSTRACT

A sliding module for a portable terminal which has a first housing and a second housing sliding on the first housing is disclosed, the sliding module slidably coupling the first and second housings. The sliding module includes a sliding plate mounted on a surface of the first housing; at least one guide rod mounted on a surface of the second housing and slidably coupled to the sliding plate, the guide rod being extended in the longitudinal direction of the second housing; at least one first guide rib formed on the sliding plate; and at least one second guide rib formed on the surface of the second housing, wherein the second guide rib is slidably engaged with the first guide rib, and maintains at least partial engagement with the first guide rib within a sliding range of the second housing.

15 Claims, 8 Drawing Sheets

SLIDING MODULE FOR PORTABLE TERMINAL

PRIORITY

This application claims priority to an application entitled "Sliding Module for Portable Terminal" filed with the Korean Intellectual Property Office on Nov. 7, 2005 and assigned Serial No. 2005-105967, the contents of which are incorporated herein by reference.

BACKGROUND OF THE INVENTION

1. Field of the Invention

The present invention relates to a portable terminal, and in particular, to a sliding module for a portable terminal which comprises a first housing and a second housing, wherein the second housing slides in the longitudinal direction of the first housing, so that a part of the first housing is opened.

2. Description of the Related Art

Typically, portable terminals are classified into bar type, flip type, and folder type depending on their external appearance.

A bar type terminal has a body-shaped housing, on which a data input means, a data output means, a transmitter unit and a receiver unit are mounted. Such a bar type terminal has a disadvantage in that a key pad, which is the data input means, is apt to malfunction because it is always exposed, and there is a limitation in miniaturizing the bar type terminal due to the problem of maintaining a sufficient distance between the transmitter unit and the receiver unit.

A flip type terminal has a body, a flip portion, and a hinge module for interconnecting the body and the flip portion, in which the body is provided with the data input means, the data output means, the transmitter unit and the receiver unit, and the flip portion covers the key pad, which is the data input means, whereby the terminal can be prevented from malfunctioning. However, there is also a limitation in miniaturizing the flip type terminal due to the problem of maintaining the sufficient distance between the transmitter unit and the receiver unit.

A folder type terminal has a body, a folder portion, and a hinge module for pivotally interconnecting the body and the folder portion, so that the folder portion can be opened or closed by being pivoted. In the state in which the folder portion is folded onto the body and is in close contact with the body, the folder type terminal is in a call waiting mode, and the terminal can be prevented from malfunctioning. In the call mode, the folder portion is unfolded away from the body, whereby it is possible to secure a sufficient distance between the transmitter unit and the receiver unit, which is advantageous for reducing the size of the terminal. For this reason, folder type terminals presently make up the majority of portable terminals.

In the flip type terminal or the folder type terminal, if the flip portion or the folder portion is pivoted in the opening direction beyond a predetermined angle, the flip portion or the folder portion will be pushed by the hinge module in the opening direction so that the flip portion or folder portion can be opened even if a force is no longer exerted on them, while if the angle between the flip portion or the folder portion and the body is less than a predetermined range, the flip portion or folder portion will be pushed back in the direction for making the flip portion or folder portion come into close contact with the body.

Meanwhile, as the design of portable terminals are diversified, sliding type terminals also have been marketed, and have two housings, one of which slides on the other, so that the other housing can be opened or closed.

U.S. patent application Ser. No. 379,551 filed on Mar. 6, 2003 and assigned to the assignee of this application, discloses a portable terminal having a pair of housings which are slidably coupled with each other, and a sliding module therefore. In the portable terminal disclosed in U.S. patent application Ser. No. 379,551, one housing slides on the other, thereby opening a part of the other housing, specifically, the key pad of the terminal. The one housing is provided with springs and the other housing is provided with sliding guides in the form of rails, so that the two housings are movably coupled by the springs and sliding guides. In addition to this type of sliding module, various types of other sliding modules are applied to sliding type terminals.

However, conventional sliding modules form an obstacle in reducing the size of terminals because movable members, such as a sliding plate, that is provided in one housing, and stationary members, such as sliding guides, that are provided in the other housing, are engaged with each other in the state of being opposite to each other and thus the sliding modules prevent a reduction in thickness.

SUMMARY OF THE INVENTION

Accordingly, the present invention has been made to solve the above-mentioned problems occurring in the prior art, and an object of the present invention is to provide a sliding module which is configured to be capable of reducing the thickness thereof so as to contribute to the miniaturization of a portable terminal.

In order to achieve the above and other objects, there is provided a sliding module for a portable terminal which has a first housing and a second housing sliding on the first housing, the sliding module slidably coupling the first and second housings, wherein the sliding module includes a sliding plate mounted on a surface of the first housing; at least one guide rod mounted on a surface of the second housing and slidably coupled to the sliding plate, the guide rod being extended in the longitudinal direction of the second housing; at least one first guide rib formed on the sliding plate; and at least one second guide rib formed on the surface of the second housing, wherein the second guide rib is slidably engaged with the first guide rib, and maintains the state of being at least partially engaged with the first guide rib within a sliding range of the second housing.

In addition, there is also provided a sliding module for a portable terminal, which has a first housing and a second housing which is slidable on the first housing, the sliding module slidably interconnecting the first and second housings, wherein the sliding module includes a sliding plate mounted on one surface of the first housing; at least a pair of receiving grooves formed on one surface of the second housing; guide rails each installed in the receiving grooves; and guide members provided on one surface of the sliding plate, the guide members being slidably engaged with the guide rails by being partially inserted into the receiving grooves.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted when it may make the subject matter of the present invention unclear.

Figure 1:
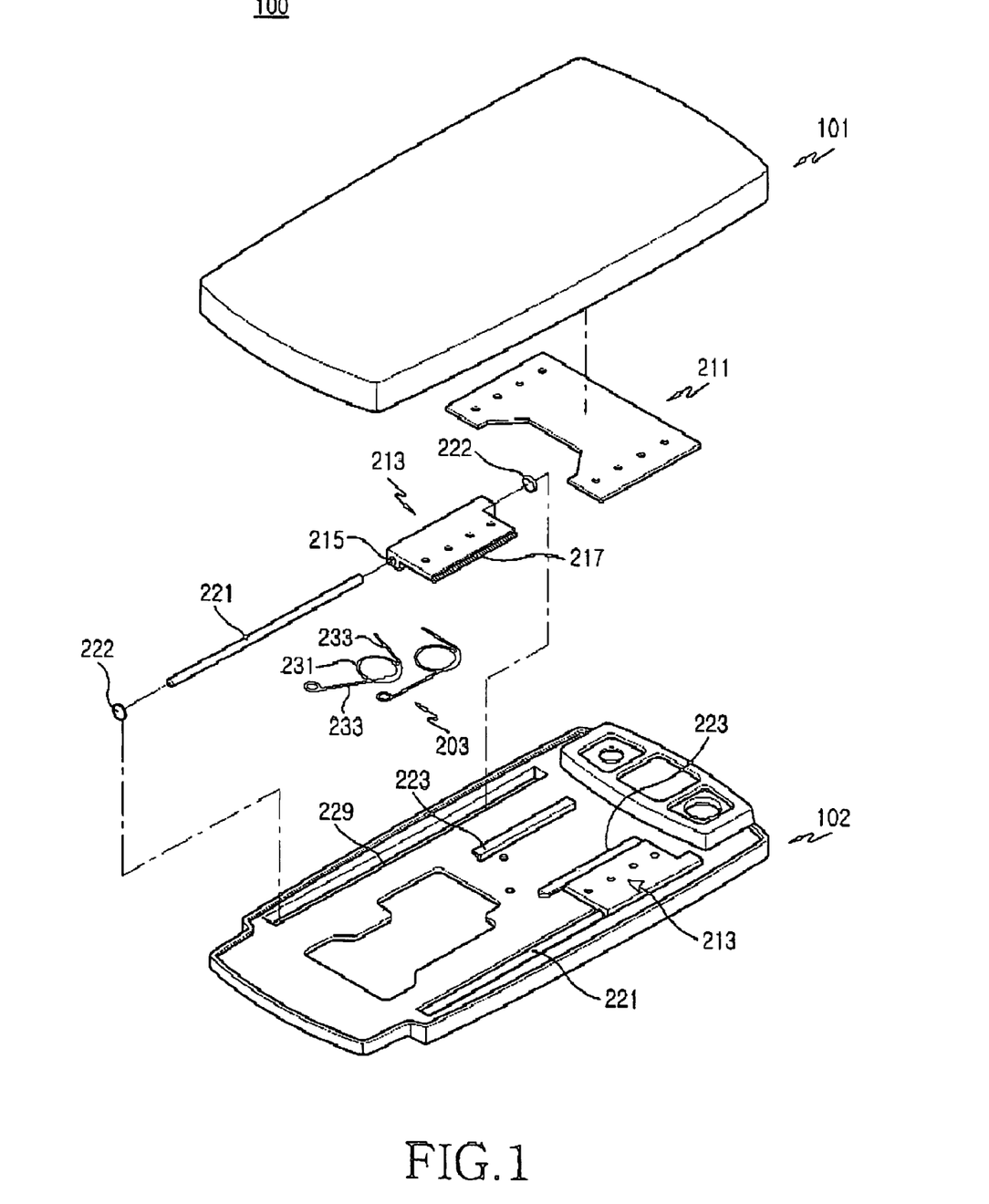
FIG. 1 is an exploded perspective view of a portable terminal with a sliding module according to the present invention.

As shown in FIG. 1, a portable terminal 100 having a sliding module according to the present invention includes a first housing 101, and a second housing 102 slidably coupled to the first housing 101. In addition, the sliding module comprises a sliding plate 201 (see FIG. 2) mounted in the first housing 101 and guide rods 221 mounted in the second housing 102.

Figure 6:
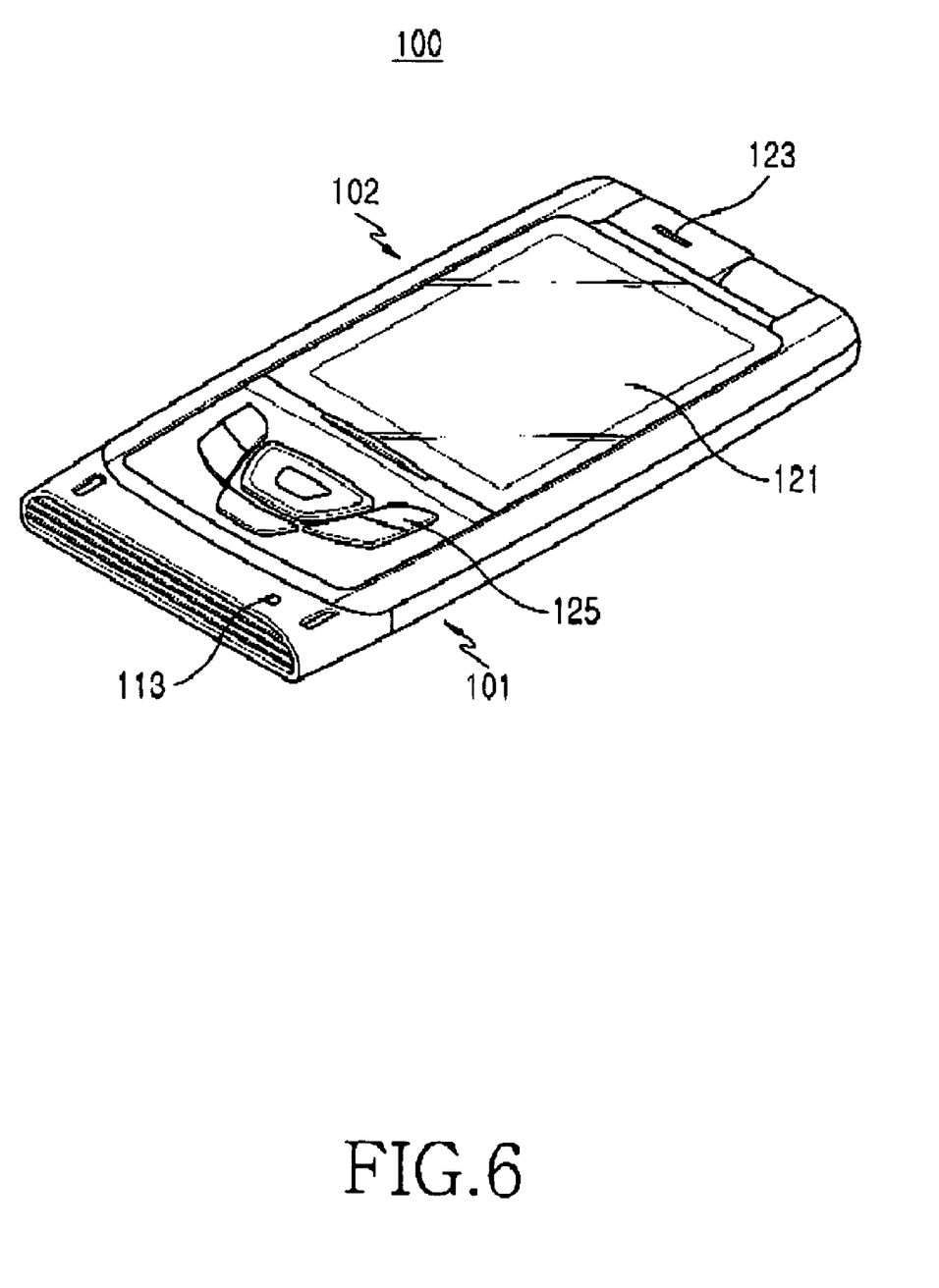
FIGS. 6 to 8 are perspective views showing sequential movement of the portable terminal shown in FIG. 1.
Figure 7:
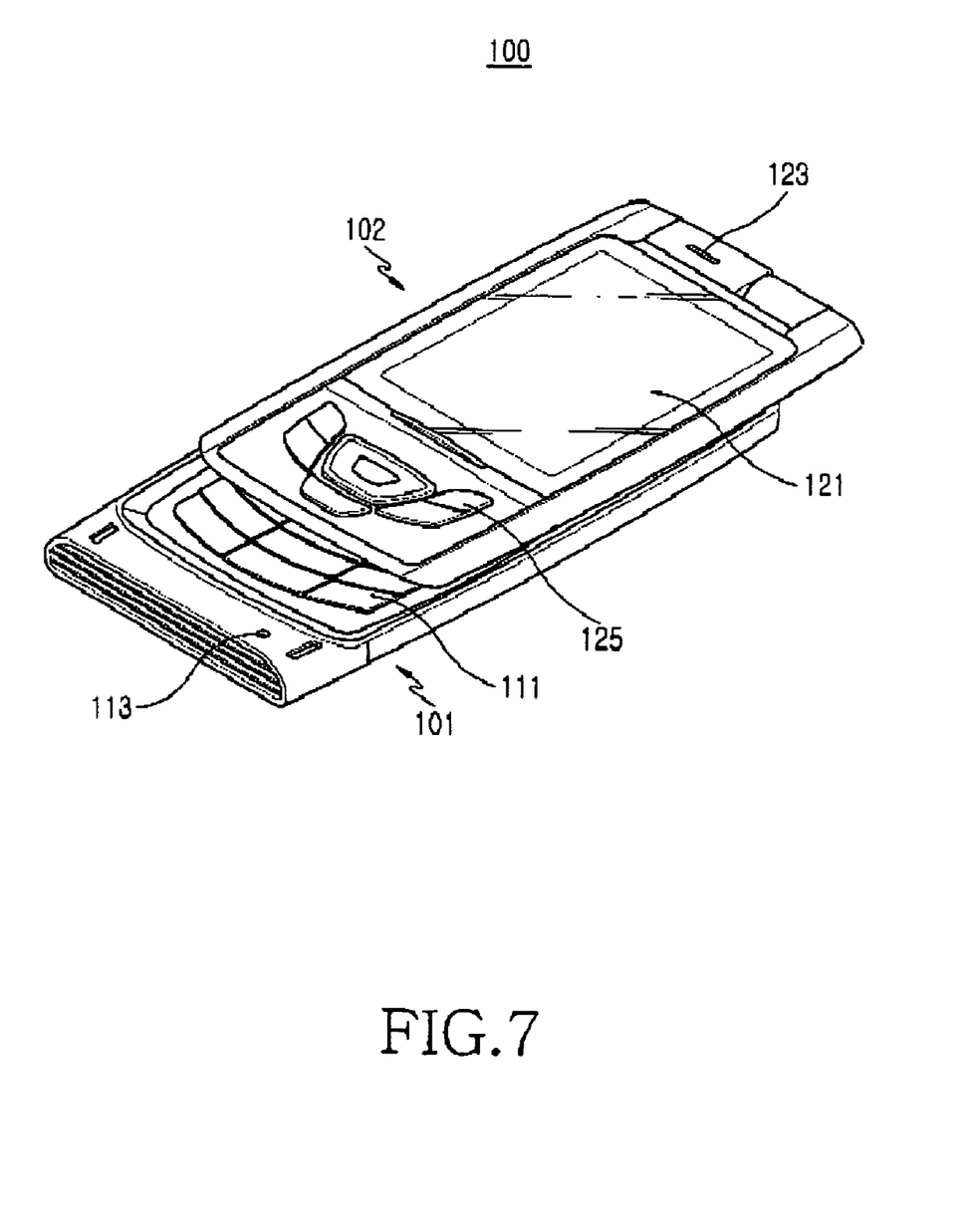
Figure 8:
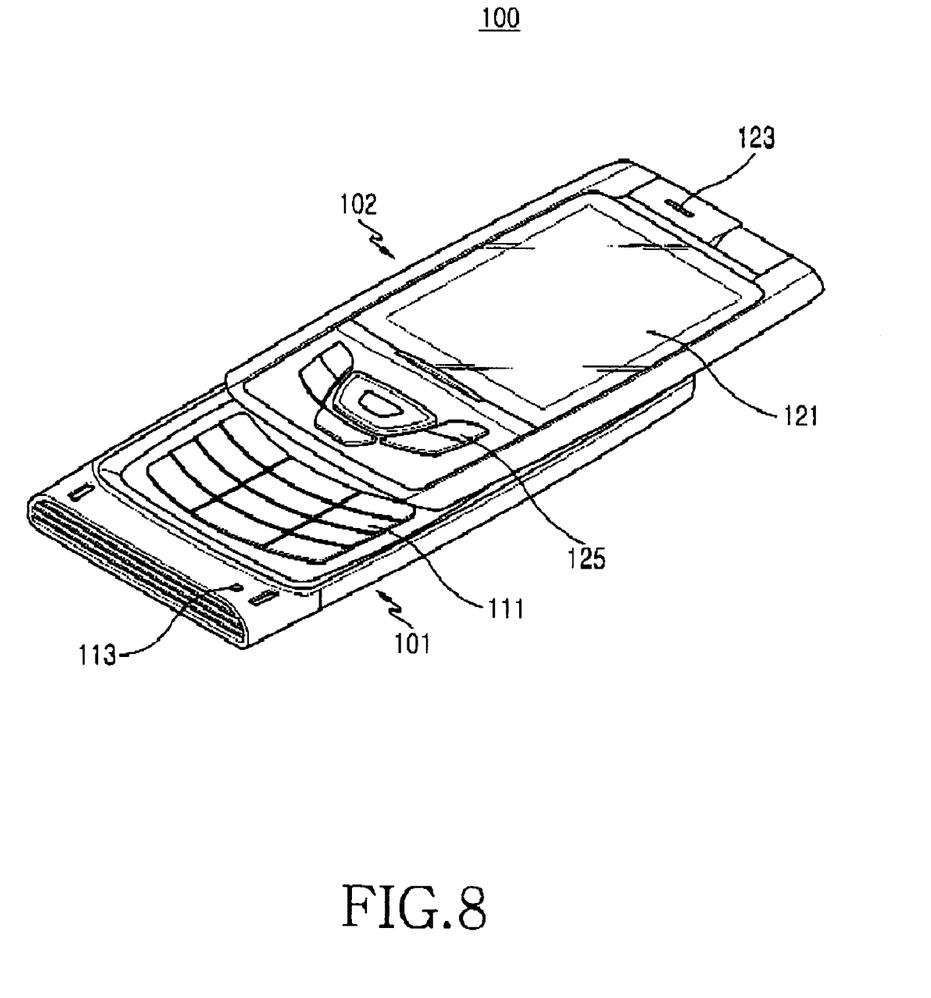

Referring to FIGS. 6 to 8, the first housing has a key pad 111 and a transmitter unit 113 mounted on the front side thereof, and the second housing 102 has a display unit 121 and a receiver unit 123 mounted on the front side thereof. A function key pad 125 may be provided adjacent to the display unit 121. As the second housing 102 slides, the key pad 111 of the first housing 101 is opened or closed.

It is noted that the views shown in FIGS. 1-5 are in effect upside down with respect to the views shown in FIGS. 6-8.

The sliding module is provided with elastic means 203, so that the elastic means 203 supplies a driving force to the second housing 102, which is exerted in the direction either for opening or closing the key pad 111. Specifically, when the second housing 102 is moved so as to open the key pad 111 beyond a predetermined range, the second housing 102 is slid in the direction for completely opening the key pad 111 by the driving force supplied by the sliding module, and when the second housing 102 is moved so as to open the key pad 111 within the predetermined range, the second housing 102 is slid in the direction for closing the key pad 111 by the driving force supplied by the sliding module. This operation will be described in more detail below.

By means of the sliding plate 201 and the guide rods 221, the sliding module slidably couples the second housing 102 to the first housing 101. In addition, by the elastic means 203, the sliding module provides the driving force for sliding the second housing 102.

Referring to FIG. 2 again, the sliding plate 201 comprises a connection member 211 and a pair of guide members 213. The guide members 213 are mounted on opposite side edges of the connection member 211, respectively, and the second housing 102 slides on the first housing 101 while being guided by the guide members 213.

Figure 2:
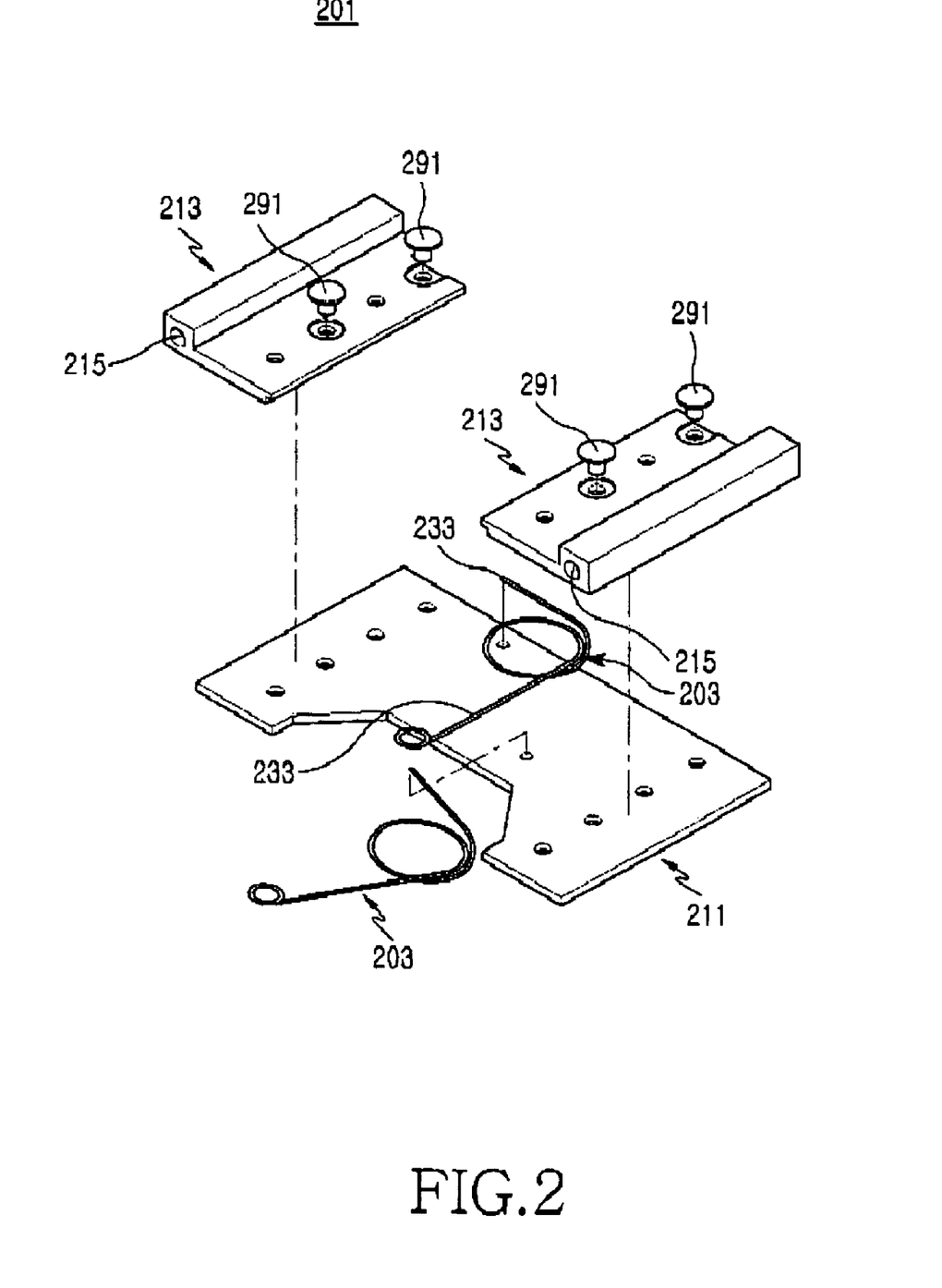
FIG. 2 is an exploded perspective view showing the configuration of a sliding plate of the sliding module shown in FIG. 1.

The connection member 211 is preferably formed from a metallic material such as SUS (stainless steel) which is superior in mechanical property, and the guide members 213 are mounted on the opposite side edges of the connection member 211, respectively. The guide members 213 are slidably coupled to the guide rods 221, wherein the guide members 213 are preferably formed from a synthetic resin in order to prevent noise produced by friction. The guide members 213 and the connection member 211 are coupled to one another, for example, by rivets 291. In addition, the connection member 211 is mounted on the front side of the first housing 101 by fastening elements such as rivets or screws. The sliding plate 201 assembled to the first housing 101 in this manner guides the sliding movement of the second housing 102.

Each guide member 213 has a through-hole 215, into which a guide rod 221 is slidably inserted. The through-hole 215 is extended in the longitudinal direction of the guide member 213 along the same direction used for sliding the second housing 102. Each guide member 213 has a first guide rib 217, which projects from the inner side thereof. If the guide members 213 are coupled to the opposite side edges of the connection member 211, respectively, the first guide rib 217 of one guide member 213 projects toward the first guide rib 217 of the other guide member 213. In addition, the first guide members 213 are opposite to one surface of the connection member 211.

Figure 4:
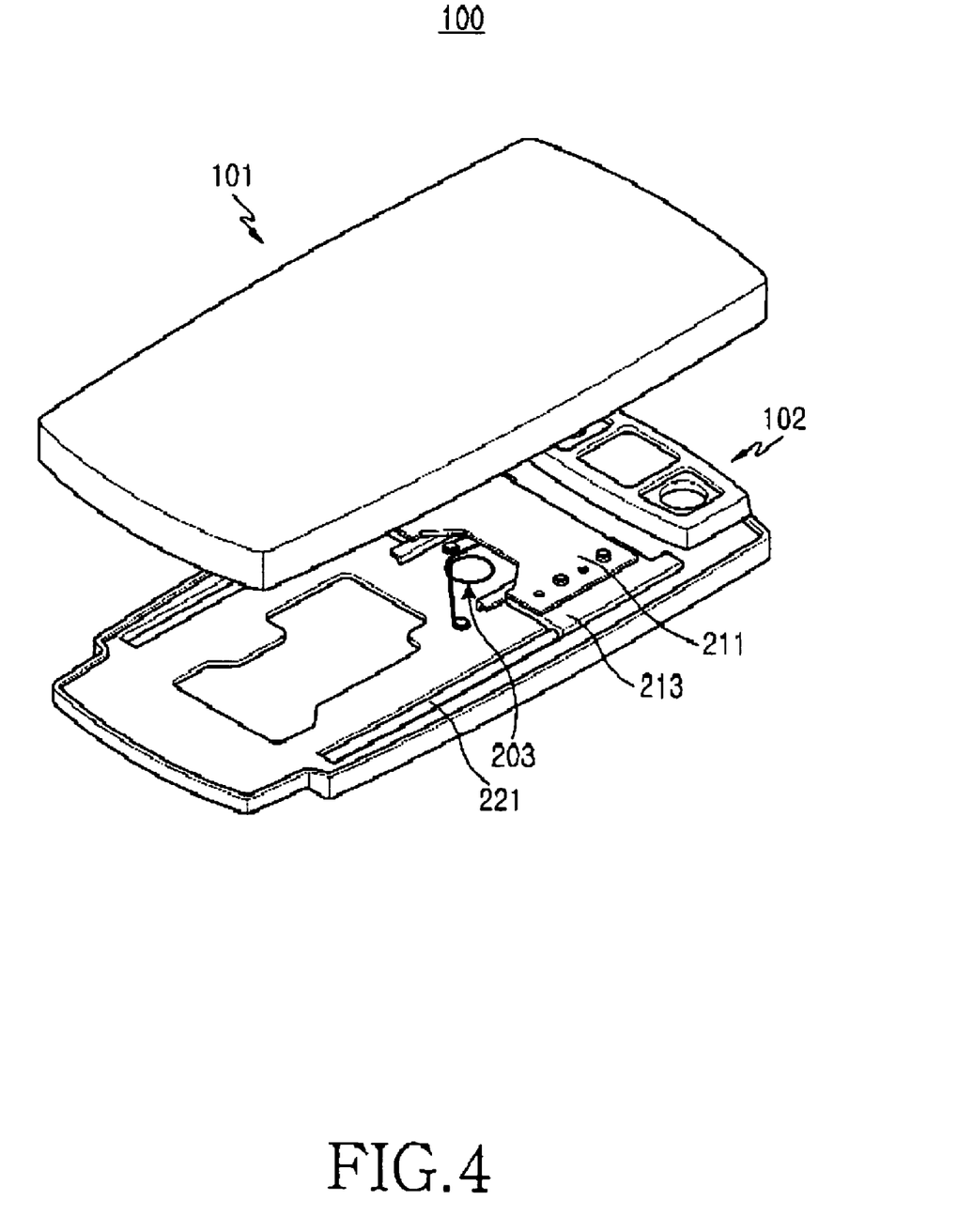
FIG. 4 is an exploded perspective view of a portable terminal showing the sliding module of FIG. 1 coupled to the second housing of the portable terminal.
Figure 5:
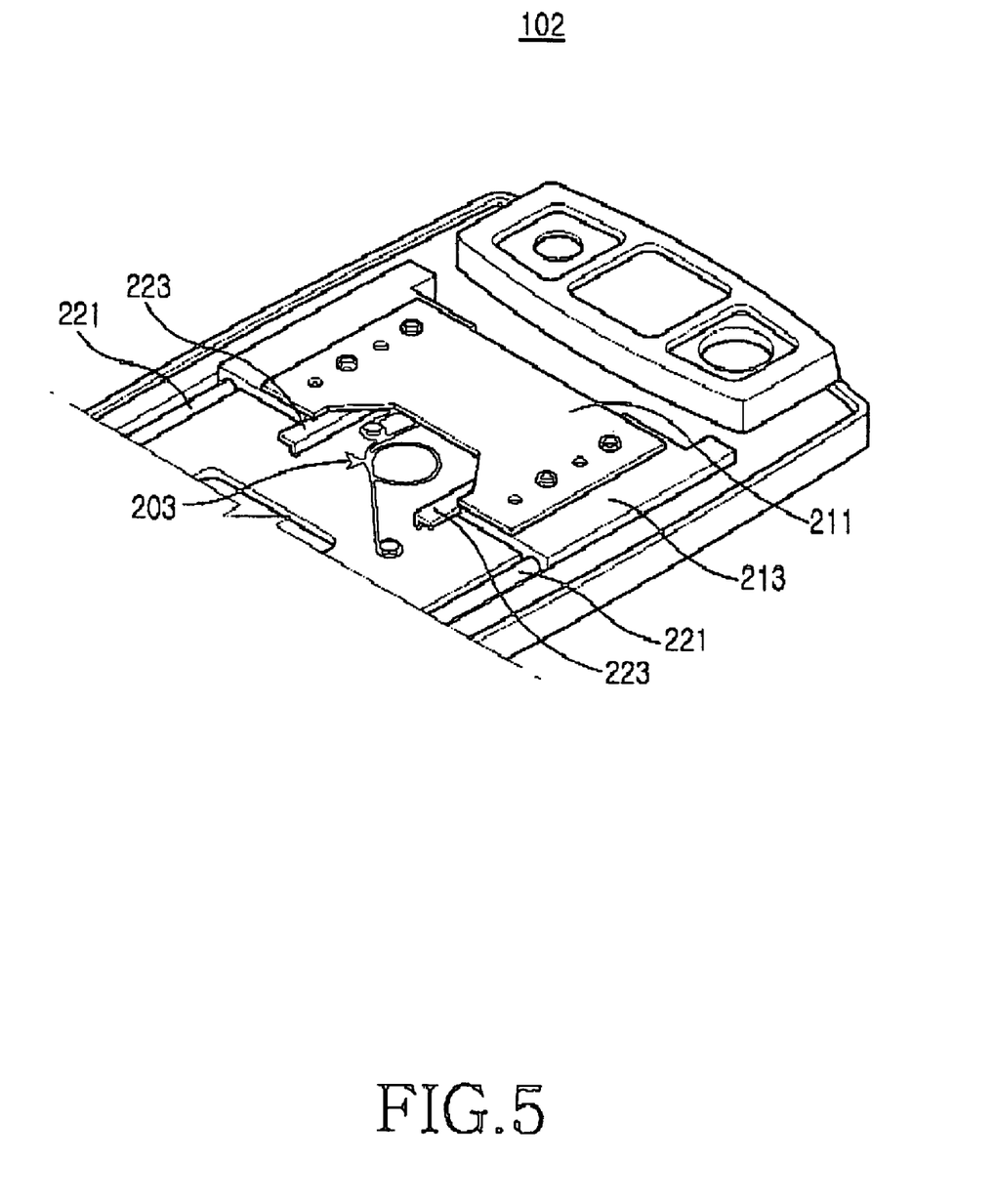
FIG. 5 is a perspective view showing the sliding module of FIG. 1 coupled to the second housing of the portable terminal in more detail.

The rear side of the second housing 102 is provided with the guide rods 221 and the second guide ribs 223 to correspond to the through-holes 215 and the first guide ribs 217.

In order to install the guide rods 221, a pair of receiving grooves 229 are formed on the rear side of the second housing 102, wherein the receiving grooves 229 extend in the longitudinal direction of the second housing 102. The guide rods 221 are received in the receiving grooves 229 in the state in which the opposite ends of the guide rods 221 abut the opposite inner end walls of the receiving grooves 229. The guide members 213 have a stepped projection, so that the projections of the guide members 213 are slidably received in the receiving grooves 229. At this time, because the guide rods 221 are received in the receiving grooves 229, the through-holes 215 of the guide members 215 are positioned within the receiving grooves 229, so that the guide rods 221 are slidably inserted into the through-holes 215. That is, the guide rods 221 serve as guide rails for guiding the movement of the sliding plate 201.

Meanwhile, the sliding range of the second housing 102 is defined by the length of the receiving grooves 229. That is, because the guide members 213 are partially received in the receiving grooves 229, respectively, the second housing 102 cannot further slide if the guide members 213 come into contact with the end walls of the receiving grooves 229.

In order to absorb shock produced when the guide members 213 come into contact with the end walls of the receiving grooves 229, dampers 222 formed of an elastic material, such as urethane and silicon, may be provided at the opposite end walls of the receiving grooves 229. When the second housing 102 slides in one direction, the second housing 102 is slid by the elastic force of the elastic means 203 provided in the sliding module, until the guide members 213 come into contact with either of the end walls of the receiving grooves 229. As the guide members 203 are slid by the elastic force of the elastic means 203, it is natural that impact is generated at the moment the guide members 213 come into contact with the end walls of the receiving grooves 229. Accordingly, by providing the dampers 222, it is intended to alleviate the impact or noise produced when the second housing 102 is slid.

The second guide ribs 223, which are provided as a pair, extend from one surface of the second housing 102 to a predetermined height and then bent away from each other. Accordingly, the bent portions of the second guide ribs 223 face the one surface of the second housing 102, and when the second housing 102 is engaged with the first housing 101, the second guide ribs 223 are interposed between the first guide ribs 217 and the connection member 211. Consequently, the first guide ribs 217 and the second guide ribs 223 are slidably engaged with each other.

It is preferable that the first and second guide ribs 217 and 223 are extended in the longitudinal direction of the second housing and are maintained in at least partial engagement with each other within the sliding range of the second housing 102. In order for the first and second guide ribs 217 and 223 to be at least partially engaged with each other within the sliding range of the second housing 102, it is necessary to secure sufficient lengths for the first and second guide ribs 217 and 223.

Here, because the first guide ribs 217 are formed on the guide members 213, whereas the second guide ribs 223 are formed on the second housing 102, it is easy to form a sufficient length for the second guide ribs 223. Therefore, it will be advantageous that the second guide ribs 223 are formed with a sufficiently long length so that at least a part of the second guide ribs 223 is engaged with the first guide members 217 within the sliding range of the second housing 102.

Consequently, the guide rods 221 are slid within the through-holes 215 of the guide members 213 and the first guide ribs 217 and the second guide ribs 223 are slidably engaged with each other, thereby guiding the sliding movement of the second housing 102.

Through the configuration of the sliding module including the sliding plate 201, the guide rods 221 and the second guide ribs 223, the second housing 102 is connected with the first housing 101 so that the second housing 101 is slid on the first housing 101.

The elastic means 203 is interposed between the sliding plate 201 and the second housing 102, in which one end of the elastic means 203 is supported on the plate 201 and the other end is supported on the corresponding surface of the second housing 102. The elastic means 203 provides an elastic force produced as the opposite ends 233 of each elastic means 203 are biased away from each other. At this time, the elastic means 203 provides the elastic force in the direction for opening or closing the key pad 111 depending on the slid position of the second housing 102.

FIGS. 1 and 2 shows an embodiment provided with torsion springs as the elastic means by way of an example. That is, the elastic means 203 consists of a coil 231 and a pair of free ends 233 extending from the coil 231 away from each other, thereby providing the elastic force produced by the free ends being biased away from each other. One of the free ends 233 is supported on the sliding plate 201 and the other is supported on the second housing 102, wherein the point that the free ends 233 come as near to each other as possible exists within the sliding range of the second housing 102.

Figure 3:
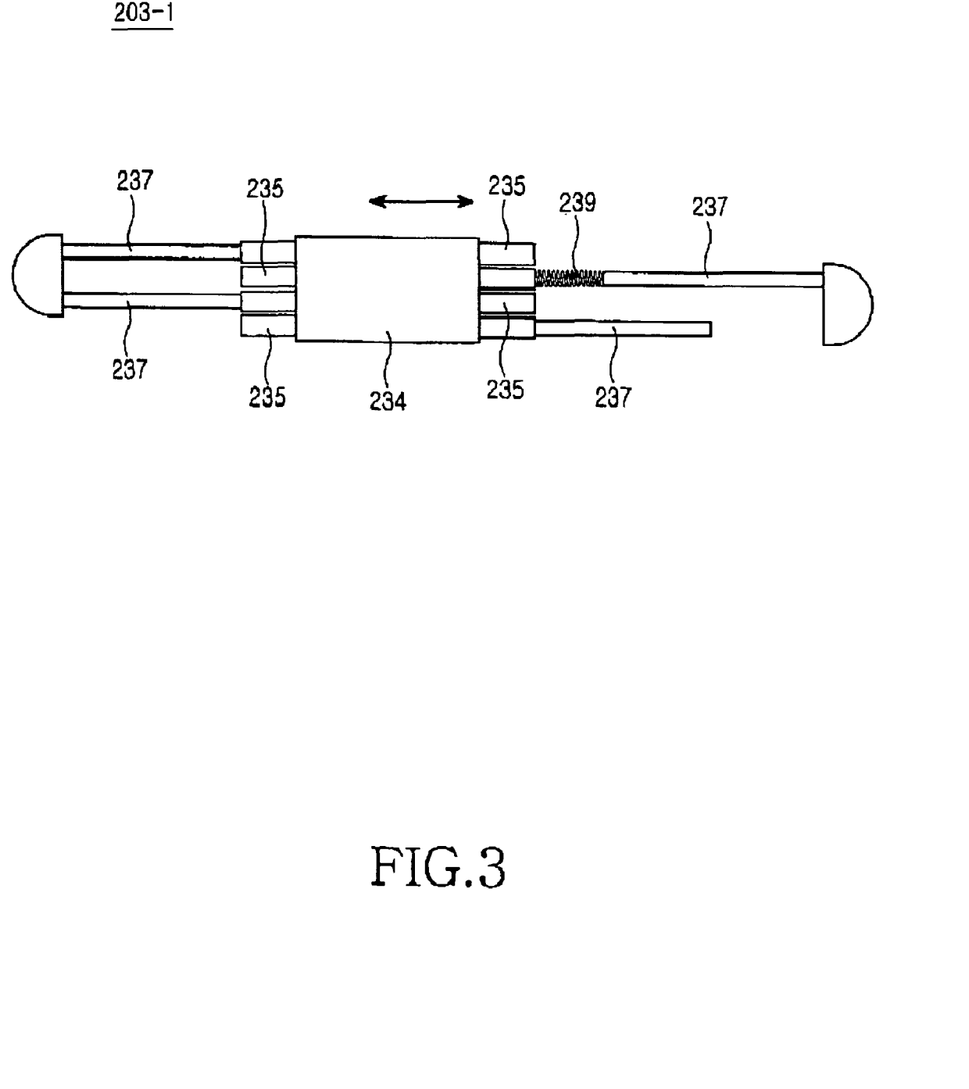
FIG. 3 is a view showing elastic means provided in the sliding module shown in FIG. 1.

Meanwhile, if it is possible to provide elastic force produced by the opposite ends being biased away from each other, another type of elastic means can be employed other than the torsion springs shown in FIG. 2. For example, an elastic member which employs a push rod can be applied to the sliding module. Referring to FIG. 3, such a push rod may comprise a first support rod 235, a second support rod 237 which is telescopically fitted in the first support rod 235, and a coil spring 239 for biasing the second support rod 237 in the direction the second support rod 237 extends from the first support rod 235. With the push rod configured in this manner, one of the first and second support rods 235, 237 is supported on the sliding plate 201 at one end thereof and supported on the second housing 102 at the other end, thereby providing elastic force for making the second housing 102 slide.

Meanwhile, the elastic member 203-1 of FIG. 3 is configured by the combination of two pairs of above-mentioned push rods. That is, the elastic member 203-1 comprises two pairs of push rods, which are alternately arranged in such a way that one pair of the second push rods 237 are extended in the direction opposite to the other pair, and the first support rods 235 are aligned and fixed by a holder 234. The elastic member 203-1 configured by the combination of the above-mentioned push rod is capable of providing elastic force, as the respective ends of the second support rods 237 are supported on either of the sliding plate 201 and the second housing 102.

The action of the sliding module associated with the sliding movement of the second housing 102 is now described with reference to FIGS. 6 to 8.

FIG. 6 shows the state in which the second housing 102 closes the key pad 111 and the guide members 213 come into contact with the top ends of the receiving grooves 229. At this time, because the elastic means 203 is exerting an elastic force produced by the opposite ends thereof biased away from each other, the guide members 213 are maintained in the state of coming into contact with the top ends of the receiving grooves 29. Accordingly, unless external force is applied to the second housing 102, the key pad 111 is stably maintained in the closed state.

If the second housing 102 is slid in the direction for opening the key pad 111 by the user as shown in FIG. 7, more elastic force builds up as the opposite ends of the elastic means 203 approach one another. At this time, the elastic force, which builds up in the elastic means 203, is applied against the movement of the second housing 102 until the opposite ends of the elastic means 203 come as near to each other as possible. That is, the elastic force, which gradually builds up in the elastic means 203 from the position where the key pad is completely closed to the position where the opposite ends of the elastic means 203 come as near to each other as possible, is converted into driving force applied in the direction for closing the key pad 111 and exerted on the second housing 102.

If the user further slides the second housing 102 so that the second housing 102 is moved beyond the position where the opposite ends of the elastic means 203 come as near to each other as possible, the driving force, which has been converted from the elastic force stored up in the elastic means 203, is changed in direction as applied to the second housing 102. That is, if the second housing 102 is further moved beyond the position where the opposite ends of the elastic means 203 come as near to each other as possible, the elastic force of the elastic member 203 is exerted on the second housing 102 in the direction for moving the second housing 102 forward to the open position shown in FIG. 8. Accordingly, the second housing 102 receives the elastic force of the elastic member 203 and moves in the direction for opening the key pad 111.

FIG. 7 shows the state in which the second housing 102 is moved, thereby exposing a part of the key pad. At this time, if the second housing 102 were moved in the direction for opening the key pad 111 but did not yet passed the position where the opposite ends of the elastic means 203 come as near to each other as possible, the elastic force of the elastic means 203 is applied to the second housing 102 in the direction for closing the key pad 111. In addition, if the second housing 102 were moved forward in the direction for opening the key pad 111 and passed the position where the opposite ends of the elastic means 203 come as near to each other as possible, the elastic force of the elastic means 203 is applied to the second housing 102 in the direction for opening the key pad 102.

To the contrary, if the second housing were moved in the direction for closing the key pad 111 but has not yet passed the position where the opposite ends of the elastic means 203 come as near to each other as possible, the elastic force 203 is applied to the second housing 102 in the direction for opening the key pad 111. In addition, if the housing 102 were moved in the direction for closing the key pad 111 and passed the position where the opposite ends of the elastic means 203 come as near to each other as possible, the elastic force of the elastic means 203 is applied to the second housing 102 in the direction for closing the key pad 111.

FIG. 8 shows the state in which the key pad 111 is completely opened. When the second housing 102 completely opens the key pad 111, the guide members 213 come into contact with the lower ends of the receiving grooves 229. At this time, because the elastic means 203 exerts elastic force in the direction that the opposite ends thereof are biased away from each other, the elastic force is applied to the guide members 213 in such a way that the guide members 213 are urged to come into close contact with the lower ends of the receiving grooves 229. Accordingly, unless external force is applied to the second housing 102, the second housing 102 is stably maintained in the state in which the second housing 102 has opened the key pad 111.

As described above, the inventive sliding module for a portable terminal employs the guide rods and second guide ribs mounted in the second housing as movable means for sliding movement, thereby making it possible to reduce the thickness of the sliding module and securing the stability of the sliding movement. Therefore, the inventive sliding module can contribute to the miniaturization of a terminal. In addition, if the inventive sliding module is applied to a sliding type terminal, it is possible to increase a space for mounting components of the terminal as compared to a conventional sliding module applied to a sliding type terminal which is same in size with that provided with the inventive sliding module.

While the invention has been shown and described with reference to certain preferred embodiments thereof, various changes and modifications can be made without departing from the scope and spirit of the present invention as defined by the appended claims. Therefore, the scope of the present invention shall be determined by the appended claims and equivalents thereof rather than by the embodiments described above.

What is claimed is:

1. A sliding module for a portable terminal having a first housing and a second housing sliding on the first housing along an upward longitudinal direction of the second housing, the sliding module slidably coupling the first and second housings, the sliding module comprising:
 a connection member mounted on the first housing and having a first surface and a second surface opposite the first surface, the first surface facing a front side of the first housing;
 a pair of guide members fixed to the second surface at opposite side edges of the connection member, each guide member having a through-hole longitudinally extending in the longitudinal direction;
 a pair of guide rods mounted on the second housing and slidably fitting in the through-holes, respectively;
 a pair of first guide ribs, each first guide rib projected from an inner edge of each guide member; and
 a pair of second guide ribs formed on a rear side of the second housing, wherein each second guide rib is slidably engaged with one of the first guide ribs, and maintains at least partial engagement with the engaged first guide rib within a sliding range of the second housing.

2. A sliding module as claimed in claim 1, wherein the second guide ribs extend from the rear side and then are bent so that their ends are directed away from each other, and the bent portions of the second guide ribs are opposite to the bottom surface.

3. A sliding module as claimed in claim 2, wherein the ends of the second guide ribs are respectively interposed between the ends of the first guide ribs and the connection member and slidably engaged with the ends of the first guide ribs.

4. A sliding module as claimed in claim 1, wherein the guide members are formed from a synthetic resin.

5. A sliding module as claimed in claim 1, further comprising a pair of receiving grooves formed on the rear side, wherein each guide rod is received in one receiving groove in the state in which the opposite ends of the guide rod is supported by the opposite ends of the receiving groove.

6. A sliding module as claimed in claim 5, further comprising dampers of an elastic material which are respectively provided at the opposite ends of the receiving groove.

7. A sliding module as claimed in claim 1, further comprising an elastic member, of which one end is supported on the connection member and the other end is supported on the rear side, the elastic member providing elastic force produced by the opposite ends of the elastic member biased away from each other.

8. A sliding module as claimed in claim 7, wherein there exists a position where the opposite ends of the elastic member come as near to each other as possible within the sliding range of the second housing, and if the second housing is moved by external force in one direction beyond the position where the opposite ends of the elastic member come as near to each other as possible, the elastic force of the elastic member is applied to the second housing, thereby moving the second housing forward.

9. A sliding module as claimed in claim 7, wherein there exists a position where the opposite ends of the elastic member come as near to each other as possible within the sliding range of the second housing, and the elastic force of the elastic member is applied in the direction which is opposite to the moving direction of the second housing until the second housing, which is moved by external force, passes the position where the opposite ends of the elastic member come as near to each other as possible.

10. A sliding module as claimed in claim 7, wherein the elastic member is a torsion spring, which comprises a coil and a pair of free ends, extending from the coil away from each other, and provides elastic force by the free ends being biased away from each other, one of the free ends being supported on the connection member and the other being supported on the second housing.

11. A sliding module as claimed in claim 7, wherein the elastic member is at least one push rod, which comprises a first support rod, a second support rod telescopically fitted within the first support rod, and a coil spring for providing elastic force acting in the direction for extending the second support rod away from the first support rod, one of the first and second support rods being supported on the connection member at one end thereof, and the other being supported by the second housing at one other end thereof.

12. A sliding module for a portable terminal, having a first housing and a second housing which is slidable on the first housing along a longitudinal direction of the second housing, the sliding module slidably interconnecting the first and second housings, wherein the sliding module comprises:
 a sliding plate mounted on one surface of the first housing;

at least a pair of receiving grooves formed on one surface of the second housing;

guide rods each installed in the receiving grooves;

guide members provided on one surface of the sliding plate, the guide members being slidably engaged with the guide rods by being partially inserted into the receiving grooves, each guide member being formed with a through-hole so that the guide rods are slidably fitted in the through-holes;

a pair of first guide ribs, each first guide rib projected from an inner edge of each guide member; and a pair of second guide ribs formed on a rear side of the second housing, wherein each second guide rib is slidably engaged with one of the first guide ribs, and maintains at least partial engagement with the engaged first guide rib within a sliding range of the second housing.

13. A sliding module as claimed in claim 12, wherein the guide rods extend in the longitudinal direction and are received in the receiving grooves in the state of being supported by the opposite inner end walls of the receiving grooves.

14. A sliding module as claimed in claim 12, wherein the guide members partially project so as to be received in the receiving grooves.

15. A sliding module as claimed in claim 12, further comprising elastic means, of which one end is supported on the sliding plate and the other end is supported on the one surface of the second housing, whereby the elastic means provides elastic force produced by the opposite ends thereof biased away from each other.

* * * * *